United States Patent [19]

Smith

[11] Patent Number: 5,682,405
[45] Date of Patent: Oct. 28, 1997

[54] ONES DENSITY MONITOR

[75] Inventor: Michael D. Smith, Flower Mound, Tex.

[73] Assignee: Dallas Semiconductor Corporation, Dallas, Tex.

[21] Appl. No.: 536,875

[22] Filed: Sep. 29, 1995

[51] Int. Cl.$^6$ ............................................. G06F 7/02
[52] U.S. Cl. ...................... 375/224; 364/715.09; 371/55
[58] Field of Search .......................... 375/224, 292, 375/357, 359; 371/55, 57.2; 364/715.09, 715.11; 377/44, 64; 370/85.3, 241, 252, 445, 516

[56] References Cited

U.S. PATENT DOCUMENTS

| | | | |
|---|---|---|---|
| 4,486,848 | 12/1984 | Kaminski | 364/715.09 |
| 4,631,695 | 12/1986 | Kozlik | 364/715.11 |
| 5,528,526 | 6/1996 | Klug et al. | 364/715.11 |

*Primary Examiner*—Benedict V. Safourek
*Attorney, Agent, or Firm*—Jenkens & Gilchrist

[57] ABSTRACT

A ones bit density monitor is disclosed which is comprised of a 31-bit shift register, a counter, and a clock circuit having logic to preclude the number representing a number of pulses within the shift register from changing whenever a pulse is simultaneously input and output from the 31-bit shift register. To accomplish this, the counter increments every time a pulse is input to the 31-bit shift register and is decremented every time a pulse is output from the 31-bit shift register. Once the count reaches the number four, the ones density monitor circuit, and more specifically the counter, outputs a signal reflecting that a carrier is back on line.

4 Claims, 2 Drawing Sheets

ONES DENSITY MONITOR

PARTIAL WAVER OF COPYRIGHT PROTECTION

A portion of the disclosure of this patent document contains material which is subject to copyright protection. The copyright owner has no objection to the facsimile reproduction by any one of the patent disclosure, as it appears in the United States Patent and Trademark office patent files or records, but otherwise reserves all copyright rights whatsoever.

FIELD OF THE INVENTION

This invention relates to digital transmission line interface circuits, and more particularly, to circuits which detect the presence or loss of a carrier.

CROSS-REFERENCE TO RELATED APPLICATIONS

This application is related to the following U.S. Patent Applications:

| SERIAL NO. | TITLE | INVENTOR(S) |
| --- | --- | --- |
| 08/536,897 (09/29/95) | Tunable Tone Control Circuit and a Device and Method for Tuning the RC Constants | Whiteside |
| 08/537,214 (09/29/95) | Differential Cross Coupled Peak Detector | Whiteside |
| 08/536,895 (09/29/95) | Amplifier with Pole/Zero Compensation | Whiteside |
| 08/536,906 (09/29/95) | Sample Point Adjustment | Smith et al. |
| 08/536,023 (09/29/95) | Oversampled State Machine for Jitter Tolerant Pulse Detection | Smith et al. |

All of the related applications are filed on even date herewith, are assigned to the assignee of the present invention, and are hereby incorporated herein in their entirety by this reference thereto.

BACKGROUND OF THE INVENTION

In the transmission of T1 digital signals, the information is transmitted in frames and synchronized by a process called framing. Each frame contains 193 bits of data with 24 frames making up an extended super frame of 4632 bits. The common North American standard for the transmission of T1 information is specified in ANSI T1.403-1989 which provides that there be a minimum of N "ones" in each and every time window of eight (N+1) time slots or bits where N is a number in the range of 1 to 23.

One way of ensuring the integrity of the transmitted data and being able to recover a clock from the incoming data is to ensure that there are a sufficient number of "ones" in a 192 bit window or time frame and monitoring the data to see that it has the required number of "one" bits. Thus, the ANSI T1 standard ensures that a clock will be able to be recovered from the incoming data.

One known method of determining whether a "ones" violation has occurred is to monitor the number of "ones" in the eight (N+1) time slots and to maintain a violation status until all 193 good bits are received.

Thus, the prior art includes examples of disclosures that deal with "ones" density violations. Some references concern themselves with merely detecting a violation while other references concern themselves with inserting an occasional "one" to avoid a violation condition.

As has been stated before, the "ones" density requirement of the T1 protocol exists to allow receiving or repeater networks to maintain synchronization and to avoid an error condition owning to a perceived carrier lost condition. In T1 networks, carrier loss is defined as 175±75 consecutive zeroes. Once a carrier loss is recognized or determined, a T1 network must include circuitry and corresponding logic which determines when the carrier is back on line.

There have been different schemes for determining that a carrier is no longer a "lost carrier". Some devices in the prior art have cleared a lost carrier determination by continuously sampling the transmission line to determine that a pulse has been transmitted. Upon recognizing that a voltage potential or a "1" is present on the line, a flag or signal indicating "lost carrier" is reset or cleared. It has been found, however, that a noise spike occurring on the transmission line can mistakenly result in the interface circuit clearing the lost carrier status when, in fact, the carrier is still off line or not transmitting.

SUMMARY OF THE INVENTION

A digital transmission line interface circuit and a method of determining that a carrier is back on line and not lost is disclosed herein. The circuit includes a 31 bit shift register and circuitry to continuously monitor all 31 values of the shift register to determine if at least three of the 31 registers plus the incoming bit contains a logic "1". If at least three of the registers contain a logic "1" and the present bit being sampled is a logic "1", the interface circuit clears its lost carrier signal to indicate that the carrier is back on line.

Specifically, a line carrying a data stream is connected to a 31-bit shift register and to one input of a two-bit up/down counter. As a pulse enters the 31-bit shift register, the up/down counter is incremented. The output of the 31-bit shift register is connected to a second input of the two-bit up/down counter. As a pulse exits the shift register, the up/down counter is decremented. If, at any one time, the 31-bit shift register contains three pulses and the present bit arriving is a pulse, the up/down counter will increment to a value of four thereby causing it to reset a signal reflective of a "carrier off line" state to reflect that the carrier is back on line.

BRIEF DESCRIPTION OF THE DRAWINGS

For a more complete understanding of the present invention and the objects and advantages thereof, reference may be made to the following descriptions taken in conjunction with the accompanying drawings in which.

DESCRIPTION OF THE PRESENTLY PREFERRED EXEMPLARY EMBODIMENTS

Figure 1:
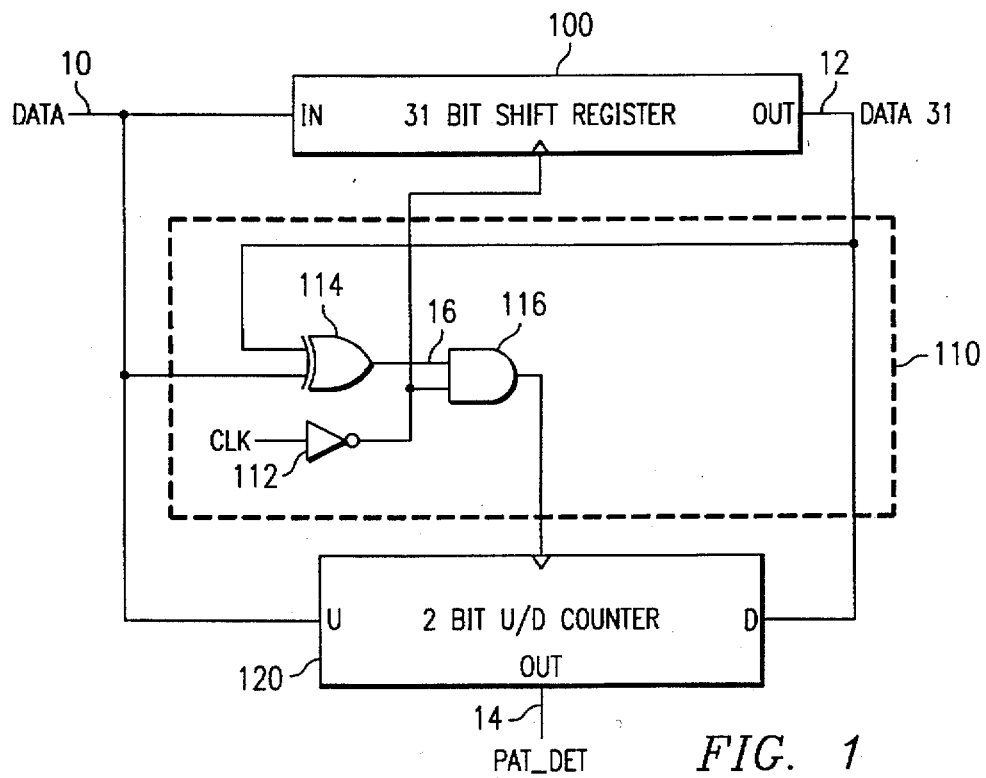
FIG. 1 is a schematic diagram of one embodiment of the invention.

Referring now to FIG. 1, a 31-bit shift register 100 is connected in parallel to a two-bit up/down (U/D) counter 120. A data stream is received from line 10 into the input of the 31-bit register 100 and into a first input of the U/D counter 120. Thus, data pulses and zeros are continuously shifted through the shift register 100 as new zeros or pulses are input from line 10. The U/D counter 120, however, instead of shifting the data stream through its registers, increments its registers every time a pulse is received into the first input from line 10.

The second input of the U/D counter 120, however, is connected to the output of the 31-bit shift register 100 by line 12. Therefore, every time a pulse is transmitted from the output of the 31-bit shift register 100 over line 12 to the second input of U/D counter 120, the U/D counter 120 decrements the number in its register. Thus, by way of example, if a pulse is input into the 31-bit shift register 100 along with 31 subsequent zeros, then the U/D counter 120 will increment the number in its register as the pulse is input to the shift register 100 as well as to the counter 120 from line 10, but will decrement once that pulse has been processed through the 31-bit shift register 100 and is output on line 12. Therefore, as may be seen, the U/D counter 120 effectively maintains a count of the number pulses within the 31-bit shift register 100 plus the incoming sample from line 10, resulting in 32-bit coverage. If the number in the counter 120 register is incremented to a value of four, then the U/D counter 120 outputs a signal on line 14 indicating that a carrier is back on line.

Continuing to refer to FIG. 1, there is shown the clock circuitry 110 which drives the 31-bit shift register 100 and two-bit up/down counter 120. Specifically, clock 112 is connected directly (through a NOT gate) to the clock input of the shift register 100. The clock input of the counter 120, however, contains some logic circuitry which, in result, prevents counter 120 from receiving a clock pulse whenever a pulse is input to the 31-bit shift register 100 on line 10 at the same time that a pulse is output from the 31-bit shift register 100 on line 12. More specifically, EXCLUSIVE OR gate 114 outputs a logic "0" whenever line 10 and line 12 carry a logic "1" or whenever line 10 and line 12 carry a logic "0". Because the output of EXCLUSIVE OR gate 114 is transmitted over line 16 to an input of AND gate 116, which has a second input the clock pulse from clock 112, the counter 120 does not receive a clock pulse whenever EXCLUSIVE OR gate 114 outputs a logic "0". Thus, counter 120 only receives a clock pulse whenever either line 10 or line 12, but not both, have a pulse while clock 112 produces a clock pulse.

Figure 2:
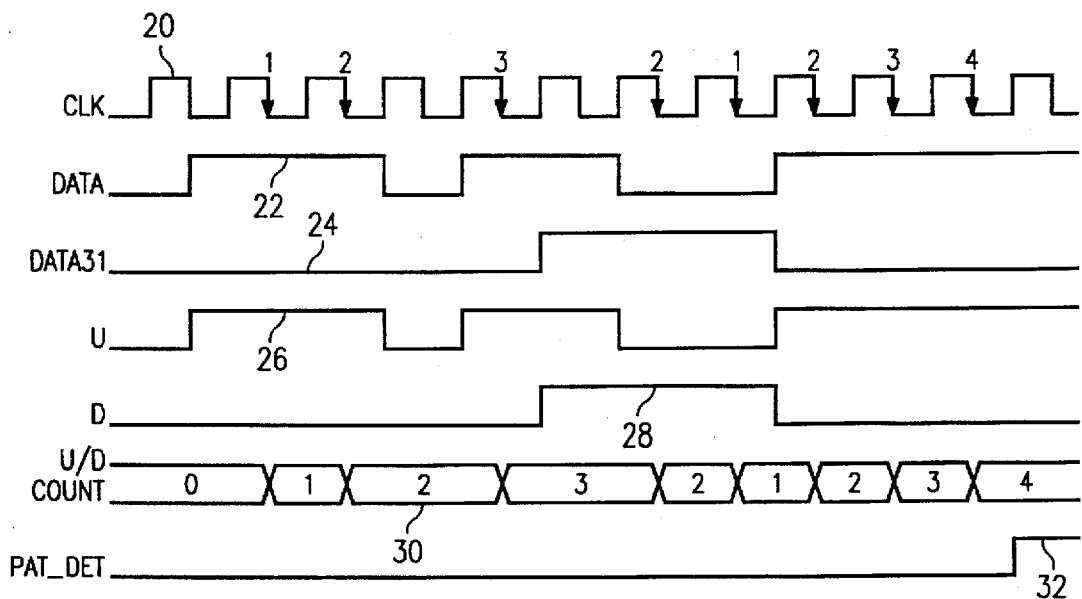
FIG. 2 is a timing diagram representing the relationship between various signals and logic states for the invention.

Referring now to FIG. 2, there is shown a timing diagram demonstrating the relationship between a variety of signals. First, as may be seen, signal 20, which is labeled "CLK" represents the clock pulses which are used to drive the 31-bit shift register 100 and the two-bit up/down counter 120. As may be seen in the diagram representing signal 20, a down arrow is shown for every clock pulse that occurs either while signal 22 (DATA) or signal 24 (DATA 31) is a logic 1. As may be seen, signal 26, which represents the input values to the up/down counter 120 is the equivalent of signal 22 because of the parallel connection of the inputs from line 10 to the shift register 100 and up/down counter 120.

Continuing to refer to FIG. 2, there is shown a signal 28 which reflects the output of the shift register 100. Thus, as is reflected by the numerals above signal 20 of FIG. 2, the internal register value of up/down counter 120 is reflected according to the combination of logic states of signals 26 and 28 as clock pulses occur. Finally, signal 32 reflects that the PAT_DET signal, which is the output of the up/down counter 120 on line 14 of FIG. 1, is set to a logic "1" whenever a clock pulse occurs and the internal register value of up/down counter 120 is equal to four. Thus, the value of a logic "1" of signal 32 reflects the status of a carrier coming back on line.

Figure 3:
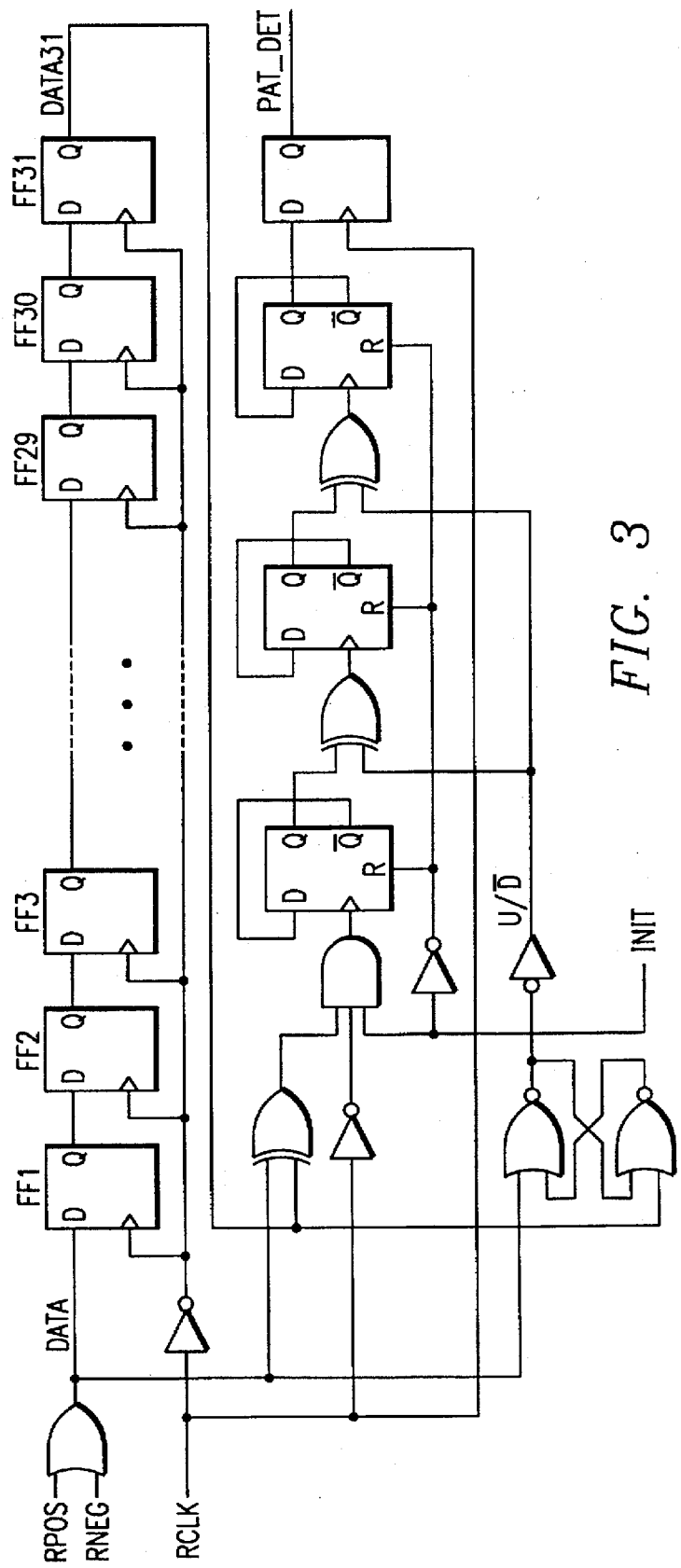
FIG. 3 is a detailed schematic which illustrates the specific arrangement of components which comprise the invention.

Referring now to FIG. 3, there is shown a detailed schematic diagram of one embodiment of the invention herein. As may be seen, the 31-bit shift register consists of thirty-one D flip flops connected in series to shift a signal value through the registers in a manner as is commonly understood. The counter consists of four D flip flops arranged in a manner to sequentially and incrementally track increments and decrements and to produce a logic "1" which is output as the signal PAT_DET whenever a total of four pulses has been input to the counter circuitry. The INIT input is used to reset the circuit.

CONCLUSION

Although a preferred embodiment of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A ones density monitor, comprising:
    a shift register for shifting a stream of data bits through its registers, which shift register includes an input and an output;
    a counter for counting the number of pulses in said shift register, which counter includes:
        a first input connected to said input of said shift register;
        a second input connected to said output of said shift register; and
        an output, wherein said counter increments an internal register every time a pulse is received on said first input and decrements said internal register every time a pulse is received on said second input; and
    wherein said counter outputs a signal on said output reflecting that a prespecified number was obtained in said register; and
    a clock circuit for providing clock pulses to said shift register and said counter.

2. The ones density monitor of claim 1 wherein said shift register contains 31 internal registers.

3. The ones density monitor of claim 1 wherein said clock circuit does not provide a clock pulse to said counter whenever said input and said output of said register are both equal to a logic "1".

4. The ones density monitor of claim 1 wherein said prespecified number of said register is equal to number four.

* * * * *